United States Patent Office 3,527,780
Patented Sept. 8, 1970

3,527,780
REDISTRIBUTION OF ALKYL GROUPS IN TETRAALKYL LEADS
George H. Williamson, Jr., Fairfax, Del., assignor to E. I. du Pont de Nemours and Company, Wilmington, Del., a corporation of Delaware
No Drawing. Filed Dec. 4, 1967, Ser. No. 687,460
Int. Cl. C07f 7/26
U.S. Cl. 260—437         6 Claims

ABSTRACT OF THE DISCLOSURE

Process for redistributing the alkyl groups of two or more different tetraalkyl lead compounds which comprises treating them with a particulate synthetic silica-magnesia catalyst.

BACKGROUND OF THE INVENTION

Field of the invention

This invention relates to a catalytic process for the redistribution of the alkyl groups of two or more different tetraalkyl lead compounds by treating them with a particulate synthetic silica-magnesia catalyst.

Description of the prior art

The catalytic redistribution of the alkyl groups in tetraalkyl lead compositions is well known, and a number of catalysts have been employed in the reaction. Catalysts which have been employed include halogen-containing compounds or certain organometallic compounds such as the ones disclosed in U.S. Pat. 2,270,108. However, commercial operations have suffered because the catalysts employed caused a degradation of some of the tetraalkyl lead reactants, and because some of the catalysts are hazardous and difficult to handle. In addition some of the catalysts react with components of the composition in which the mixed tetraalkyl lead compounds are used.

Other catalysts which have been used include aluminosilicate clays, synthetic zeolites, zeolites, activated silicas or activated aluminas, as disclosed in U.S. 3,231,510. However, these catalysts are not entirely satisfactory because they require elevated temperatures (about 50° C. to about 85° C.) for most efficient conversion and for long-life activity. Moreover these catalysts appear to be sensitive to water, requiring the catalyst, the reactants and the medium to be dry for optimum redistribution effectiveness.

It would be desirable to effect redistribution at ambient temperatures, e.g., between about 20° C. and 40° C. to reduce hazards and loss of materials due to feed and product volatility. In addition, since commercially produced tetraalkyl leads are conveniently recovered by steam distillation and since the scavengers and hydrocarbon diluents used with the tetraalkyl leads normally contain about 0.1 to 0.2 weight percent water, it would be desirable to use feed components without having to resort to special drying. Moreover it would be desirable to provide a catalyst which retains its catalytic effectiveness at ambient temperatures.

SUMMARY OF THE INVENTION

This invention is directed to a catalytic process for the redistribution of alkyl groups in at least two different tetraalkyl lead compounds, i.e., tetraalkyl lead compounds having two or more different alkyl groups, which comprises contacting said compounds with a particulate, solid, synthetic silica-magnesia composition comprsing empirically about 60 to 64% silica, about 24 to about 28% magnesia, and about 8 to about 16% water.

The process affords rapid and effective redistribution of alkyl groups at relatively low temperatures, e.g., 20° to 40° C. in the presence of water normally associated with the crude tetraalkyl lead compounds to be redistributed with the hydrocarbon diluents employed, if any, and with halocarbon scavengers employed, if any. By "water normally associated with" is meant about 0.1 to about 0.2 weight percent water present based on the feed composition weight.

A preferred tetraalkyl lead composition employed in the process is a mixture of tetramethyl lead and tetraethyl lead.

DESCRIPTION OF THE INVENTION

The tetraalkyl lead compositions employed in the process of this invention are preferably mixtures of tetramethyl lead and tetraethyl lead, usually in amounts of from about 0.25 mole of tetramethyl lead to about 4 moles of tetramethyl lead per mole of tetraethyl lead. Single tetraalkyl leads having different alkyl groups may also be used; for example, dimethyldiethyl lead undergoes redistribution of its alkyl groups to give, at equilibrium, a composition having tetramethyl lead, trimethylethyl lead, dimethyldiethyl lead, methyltriethyl lead and tetraethyl lead. There may also be used mixtures of two or more different tetraalkyl leads with dissimilar alkyl groups attached to at least one of the lead atoms; for example, a mixture of triethylmethyl lead and tetramethyl lead. Tetraalkyl lead compositions to be redistributed by the process of this invention can include those having methyl and ethyl groups and also those with propyl, butyl and higher alkyl groups. The important requirement is that the tetraalkyl lead composition contain at least two different alkyl groups.

Inert hydrocarbon diluents may also be incorporated in the tetraalkyl lead compositions to be redistributed. The usual range of dilution with said hydrocarbons is from about 1 to about 50 weight percent of the total tetraalkyl lead present. Suitable inert hydrocarbons are, for example, toluene, hexanes, heptanes, kerosenes and the like.

Halocarbon scavengers may also be incorporated in said tetraalkyl lead compositions to be redistributed. The usual range of halocarbon concentration is from about 0.5 to about 4.0 atoms of halogen per atom of lead. Representative halocarbon scavengers include ethylene dichloride, ethylene dibromide or mixtures thereof.

Feed stocks for redistribution ordinarily comprise the tetraalkyl lead compositions with two or more different alkyl groups or said tetraalkyl lead compositions mixed with the hydrocarbon diluents and the halocarbon scavengers. Both the hydrocarbon diluents and the halocarbon scavengers offer a considerable degree of thermal stabilization to tetraalkyl leads containing them, as is well known in the art. The presence of these products, though not necessary, offers a safety advantage in the redistribution process.

Means for contacting the catalyst and the feed stocks may be achieved by a variety of methods well known in the art for effecting intimate contact between a particulate, solid catalyst and a fluid composition. One method comprises contacting the catalysts and the feed stock in an agitated vessel, recovering redistribution product and separating it from the solid catalysts by filtration, centrifugation, or simple settling. A preferred method, and one in which the catalyst employed herein is particularly suitable because of its activity, capacity and particle size, comprises percolating the feed stock through a column or packed bed of the catalyst. Such a column is provided with appropriate associated equipment, well known in the art of operating such packed bed or column reactors. Thus the associated equipment includes vessels for containing feed stock and collecting product effluent in a safe and efficient manner together with appropriate valveand-line combinations to direct and control flow of feed stock and effluent product from feed storage, through the column and into the collecting vessel.

Such a column process may be operated on a continuous, semicontinuous or batch basis.

Materials of construction of the column and its associated equipment may be any of those practical materials well known in the art; for example, carbon steel, glass, glass-lined steel and seals or gaskets of polytetrafluoroethylene resin, or like materials.

The process of this invention may be operated at any temperature between the solidification temperature of the feed stock and the decomposition temperature of tetraalkyl leads. A practical temperature range would be from about 0° C. to about 90° C., since below 0° C. redistribution rates may become impractically slow, while above 90° C. one approaches the decomposition temperature of alkyl leads. For example, tetraethyl lead shows appreciable thermal decomposition at about 100° C. A particularly important feature of the representative catalyst is that it permits very effective operation at temperatures between about 20° C. and about 40° C., that is, in the ambient temperature range. Advantages of the 20° to 40° C. range are that elaborate temperature controls are not needed, simplified equipment may be used, there is less vapor loss than at higher temperatures, and the temperature operation is well below the thermal decomposition temperature of the tetraalkyl leads.

The ratios of feed stock to catalyst in this invention may vary from 20 parts by weight of feed stock to 1 part by weight of catalyst to over 1000 parts of feed stock per part of catalyst. As would be expected, the smaller this ratio, the greater will be the rate of redistribution at a given reaction temperature. Contact times to effect complete redistribution will vary with the system being employed. In an agitated vessel, at about 28° C., with about 20 parts of feed stock (containing 79 weight percent mixed tetramethyl and tetraethyl lead) and 1 part of the representative catalyst, redistribution is essentially complete in an hour, while in the preferred packed bed reactor, again at about 28° C., contact times of about 6 to 10 hours are required to effect complete redistribution, but the weight ratio of feed stock to catalyst may be over 1000:1 in this latter case.

Thus, it may be appreciated that by controlling feed stock to catalyst ratios, temperatures and contact times one can achieve complete redistribution of tetraalkyl lead compositions containing at least two different alkyl groups. It may be equally appreciated that by adjusting any one, two or all of the above three control factors, one may achieve redistribution to any desired extent, for example, from redistribution mixtures having very little redistributed tetraalkyl leads present to complete, statistical redistribution.

The extent of redistribution in a redistributed mixture is determined by such means as fractional vacuum distillation or vapor phase chromatography using a chromatograph which has ben calibrated with mixtures of tetraalkyl leads of known quantitative composition.

When equimolar mixtures of tetramethyl and tetraethyl lead are redistributed, complete statistical redistribution would be expected to provide 37.5 mole percent of dimethyldiethyl lead. In actual practice, however, complete redistribution is indicated by a dimethyldiethyl lead mole percentage of 41 to 43. This effect results because the methyl and ethyl groups are not quite identically mobile under redistribution conditions. However, as is known in the art, the mole percent of dimethyldiethyl lead accurately reflects the extent of redistribution.

The following examples are provided to more fully illustrate the invention, but are not intended to limit the invention in any manner.

EXAMPLE 1

To an agitated equimolar mixture of tetramethyl lead and tetraethyl lead consisting of 36 weight percent tetramethyl lead, 43 weight percent tetraethyl lead, 13 weight percent ethylene dichloride, 7 percent toluene and 1 percent other ingredients comprising kerosene and turpentine, 0.1 to 0.2 weight percent water, based on the total

TABLE

| Experiment Number | Catalyst | | Catalyst consisting essentially of: | Percent completion of redistribution |
|---|---|---|---|---|
| 1 | Silica magnesia | | 62 wt. percent $SiO_2$, 26 wt. percent MgO 12 wt. percent $H_2O$. Mesh: 85 percent through 200 mesh screen. Surface area: about 500 m.$^2$/g. | 100 |
| 2 | Silica-aluminas | | | |
| 2A | | High alumina | 28 percent $Al_2O_3$, 72 percent $SiO_2$ plus traces of other oxides. 250 mesh 525 m.$^2$/g. | <1 |
| 2B | | Low alumina | 13 percent $Al_2O_3$, 87 percent $SiO_2$ plus traces of other oxides. 250 mesh 410 m.$^2$/g. | 40 |
| 3 | Activated alumino-silicate clays | | 74 percent $SiO_2$, 17.5 percent $Al_2O_3$, 4.5 percent MgO, 1.5 percent $Fe_2O_3$ plus traces of other oxides. | |
| 3A | | A | (100/200 mesh)[1] | 30 |
| 3B | | B | (20/60 mesh)[1] | 70 |
| 3C | | C | (10/20 mesh)[1] | 35 |
| 4 | Activated alumina | | Essentially powdered anhydrous $Al_2O_3$ | <1 |
| 5 | Magnesium oxide | | AR grade powder, essentially pure MgO | <5 |
| 6 | Activated silica gel | | Particulate, amorphous $SiO_2$ | 15 |
| 7 | Zeolites | | | |
| 7A | | A | 14 percent $Al_2O_3$, 75 percent $SiO_2$, 11 percent $H_2O$ and trace oxides. 250 mesh. | 45 |
| 7B | | B | 31 percent $Al_2O_3$, 57 percent $SiO_2$, 12 percent $H_2O$ and trace oxides. 250 mesh. | <5 |
| 8 | Synthetic zeolites | | | |
| 8A | | A | $\frac{Na+K}{2}$12 $(Al_2O_3)_{12}(SiO_2)_{12}$ {27 $H_2O$} 1.6 mm. diameter beads | <5 |
| 8B | | B | $\frac{Na+K}{2}$86 $(Al_2O_3)_{86}(SiO_2)_{106}$ {.276 $H_2O$} 1.6 mm. diameter beads | <5 |
| 9 | Sepiolite[2] | | 61 wt. percent $SiO_2$, 27 wt. percent MgO and 12 wt. percent $H_2O$, ground to pass 200 mesh. | |
| 9A | | As ground | do | 3 |
| 9B | | Heated to 250° C. for 4 hours | do | 6 |
| 9C | | Heated to 500° C. for 4 hours | do | 6 |
| 10 | Talc | | 64 wt. percent $SiO_2$, 32 wt. percent MgO and 4 wt. percent $H_2O$ ground powder. | 3 |
| 11 | Commerical magnesium silicate composition | | 84 wt. percent $SiO_2$, 15.5 wt. percent MgO and 0.5 wt. $Na_2SO_4$ 60/100 mesh, surface area 298 m.$^2$/g. | 4 |
| 12 | Physical mixture | | 70 wt. percent activated silica gel, surface area 300–800 m.$^2$/g. and 30 wt. percent MgO powder, surface area 170 m.$^2$/g.$^2$; ground to powder and thoroughly mixed. | 5 |

[1] Refers to Tyler standard screen scale; thus, (100/200) refers to particles which would pass a 100 mesh screen but be retained by a 200 mesh screen.
[2] The surface areas of the sepiolite and the talc are not known. They were, however, ground to powder to afford a maximum surface area for the experiments summarized by this table.

NOTE—Mesh herein refers to the Tyler standard screen scale.

feed stock weight, and higher boiling alkyl lead products, was added 4.8 weight percent of the silica-magnesia catalyst used in this invention, as is shown in the following table as experiment No. 1. The temperature was held at 28±1° C. by a thermostatically controlled water bath and agitation was of sufficient vigor to maintain catalyst evenly distributed throughout the suspension. After 60 minutes the redistribution mixture was recovered by filtration and analyzed for extent of redistribution by a vapor phase chromatographic determination of mole percent dimethyldiethyl lead. A number of other catalysts, not of this invention, were also tested by this procedure; results with them are also shown in the table as experiments 2 through 12.

The foregoing results clearly demonstrate the superiority of the representative catalyst over others and especially over two of its empirical components, $SiO_2$ and MgO tested separately.

The following example illustrates the process of this invention in a packed bed or column of the representative silica magnesia catalyst.

EXAMPLE 2

A glass column 92 cm. long and 2.5 cm. inside diameter and provided with a 10 cm. long water jacket for accurate temperature control at the reaction zone, was packed with 10 cm. of the silica-magnesia of the empirical composition described in Example 1, having a microspheroidal form and of which about 85% would pass through a 200 mesh screen (Tyler standard screen) and which had a surface area of about 500 m.$^2$ per gram. The feed stock described in Example 1 was percolated through this column by gravity, using appropriately placed needle valves in the feed and effluent lines to control flow rates of feed stocks and effluent, and, thus, to control contact or residence time. The column was operated at 28±1° C. using a residence time of about 9 hours to effect essentially complete redistribution of the tetramethyl and tetraethyl lead mixture of the feed stock.

After about 800 parts by weight of the feed stock per part of catalyst had been processed, catalyst activity was still as high as it had been when only 200 parts of feed stock had been processed, indicating that catalyst activity was not decreasing and that substantially more feed stock than 800 parts per part of catalyst could be redistributed.

The silica-magnesia catalysts employed herein are prepared by a variety of methods: for example, by impregnating washed silica hydrogel with a magnesium sulfate solution and then precipitating magnesia in the silica hydrogel by the action of ammonia. The impregnated hydrogel is then washed with water to remove soluble materials, dried and activated, usually by heating to 600 to 800° C. Similarly, the magnesium sulfate may be added to a freshly prepared silica hydrosol before it settles and gels. After settling of the magnesium sulfate containing hydrogel, treatment with ammonia precipitates the magnesia in the hydrogel, as above, and washing, drying and activation as described above complete the preparation of a silica-magnesia catalyst. A particular method for preparing the catalysts of this invention is more fully described in U.S. Pat. 2,565,627, which describes mixing a predetermined quantity of powdered magnesium oxide calculated to afford the desired quantity of magnesia in the final catalyst (said MgO consisting essentially of 91 to 92 weight percent MgO, 2–3 percent water and the balance impurities as soda, lime and traces of other oxides) into an aqueous solution of an alkali metal silicate in a quantity calculated to provide the desired amount of silica in the product catalyst. The alkali metal silicate, for example, can consist essentially of 14 parts by weight of 40° Bé. sodium silicate diluted with 9 parts of water. After agitation, a slurry of MgO in sodium silicate solution results. This slurry at about 27° C. is next acidified with an inorganic acid, such as sulfuric acid having an acid temperature of about 49° C., in such quantity to produce a hydrosol with no more than 0.5 equivalent of free acid per liter of hydrosol. The acidified hydrosol is allowed to settle and set into a gel. The gel is then washed to remove excess acid and soluble salts, with water having a pH of from 7 to 8 (to avoid loss of magnesia). The product is dried to a moisture content of 12 to 15 weight percent water content, broken into fragments of optimum size, and activated by heating at approximately 675° C.

The catalysts of this invention, prepared by the latter process have an empirical composition of about 60 to 64 weight percent $SiO_2$, about 24 to 28 weight percent MgO, and about 12 to 16 weight percent water. A representative catalyst of this invention, also prepared by the foregoing method, has an empirical composition of about 62 weight percent $SiO_2$, about 26 percent MgO, and about 12 percent water. Said catalyst is microspheroidal in form, has a surface area of about 500 square meters per gram and a particle size of from 10 to 400 mesh (Tyler standard screen scale) and more particularly a particle size such that, at least, 85 weight percent of catalyst particles will pass through a 200 mesh screen (Tyler standard screen scale).

The foregoing detailed description has been given for clearness of understanding only and no unnecessary limitations are to be understood therefrom.

The embodiments of the invention in which an exclusive property or privilege is claimed are defined as follows:

1. Process for the redistribution of alkyl groups in tetraalkyl lead compounds having two or more different alkyl groups, which comprises contacting said compounds with a particulate, solid synthetic silica-magnesia catalyst that has the empirical composition: 60–64 weight percent $SiO_2$, 24–28 weight percent MgO, and 8–16 weight percent water, the sum of the percents being 100 percent.

2. The process of claim 1 wherein the contact is carried out in the presence of an inert hydrocarbon diluent.

3. The process of claim 1 wherein the contact is carried out in the presence of ethylene dichloride, ethylene dibromide, or mixtures thereof.

4. The process of claim 1 wherein the tetraalkyl lead compounds are tetramethyl lead an tetraethyl lead.

5. The process of claim 1 carried out at a temperature of between about 20° C. and 40° C.

6. The process of claim 1 wherein the silica-magnesia catalyst has the empirical composition: about 62 weight percent $SiO_2$, about 26 weight percent MgO and about 12 weight percent water.

References Cited

UNITED STATES PATENTS

| | | | |
|---|---|---|---|
| 2,270,108 | 1/1942 | Calingaert et al. | 260—437 |
| 2,571,987 | 10/1951 | McDyer et al. | 260—437 |
| 2,882,243 | 4/1959 | Milton | 252—455 |
| 3,231,510 | 1/1966 | Closson | 260—437 XR |

TOBIAS E. LEVOW, Primary Examiner

H. M. S. SNEED, Assistant Examiner